United States Patent
Teflioudi et al.

(10) Patent No.: US 12,153,965 B2
(45) Date of Patent: Nov. 26, 2024

(54) ALLOCATION OF WORKER THREADS IN A PARALLELIZATION FRAMEWORK WITH RESULT STREAMING

(71) Applicant: SAP SE, Walldorf (DE)

(72) Inventors: Christina Teflioudi, Heidelberg (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 450 days.

(21) Appl. No.: 17/688,212

(22) Filed: Mar. 7, 2022

(65) Prior Publication Data

US 2023/0281055 A1    Sep. 7, 2023

(51) Int. Cl.
  *G06F 9/44* (2018.01)
  *G06F 9/48* (2006.01)
  *G06F 9/50* (2006.01)

(52) U.S. Cl.
  CPC ............ *G06F 9/505* (2013.01); *G06F 9/4881* (2013.01)

(58) Field of Classification Search
  CPC .................................................... G06F 9/055
  USPC ............................................................ 718/104
  See application file for complete search history.

(56) References Cited

U.S. PATENT DOCUMENTS

| | | | |
|---|---|---|---|
| 2016/0012099 A1* | 1/2016 | Tuatini | G06F 16/24539 707/689 |
| 2018/0150516 A1* | 5/2018 | Stephan | G06F 16/24532 |
| 2018/0218039 A1* | 8/2018 | Steinbeck | G06F 16/24542 |

* cited by examiner

*Primary Examiner* — Timothy A Mudrick
(74) *Attorney, Agent, or Firm* — Mintz Levin Cohn Ferris Glovsky and Popeo, P.C.

(57) ABSTRACT

A method for allocating worker threads may include receiving a first fetch call for a query accessing a dataset stored at a database. The first fetch call may require a first portion of a result for the query. A first quantity of worker threads may be allocated to generate the first portion of the result for the query in response to the first fetch call. In response to a second fetch call for the query by determining a threshold corresponding to the first quantity of worker threads, a second quantity of data required for the second fetch call, and a third quantity of data buffered from the first fetch call. A second quantity of worker threads to generate a second portion of the result for the query may be allocated based on the threshold. Related systems and computer program products are also provided.

20 Claims, 5 Drawing Sheets

ALLOCATION OF WORKER THREADS IN A PARALLELIZATION FRAMEWORK WITH RESULT STREAMING

TECHNICAL FIELD

The subject matter described herein relates generally to database processing and more specifically to the allocation of worker threads to perform the tasks associated with a query.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for worker thread allocation. In some example embodiments, there is provided a system that includes at least one processor and at least one memory. The at least one memory may include program code that provides operations when executed by the at least one processor. The operations may include: receiving a first fetch call for a query accessing a dataset stored at a database, the first fetch call requiring a first portion of a result for the query; responding to the first fetch call by allocating a first quantity of worker threads to generate the first portion of the result for the query; responding to a second fetch call for the query by determining a threshold corresponding to the first quantity of worker threads, a second quantity of data required for the second fetch call, and a third quantity of data buffered from the first fetch call; and allocating, based at least on the threshold, a second quantity of worker threads to generate a second portion of the result for the query.

In some variations, one or more features disclosed herein including the following features can optionally be included in any feasible combination. The first portion of the result and the second portion of the result may each include some but not all of the result for the query.

In some variations, the first portion of the result may include a first data responsive to the first fetch call and a second data for buffering in anticipation of the second fetch call.

In some variations, the second quantity of worker threads may be allocated in response to the second fetch call requiring more than the second data.

In some variations, the allocating of the second quantity of worker threads may include waking up one or more worker threads paused subsequent to the first fetch call.

In some variations, the allocating of the second quantity of worker threads may include instantiating one or more new worker threads.

In some variations, the first quantity of worker threads may be assigned to perform a first plurality of tasks associated with the query. The second quantity of worker threads may be assigned to perform a second quantity of tasks associated with the query.

In some variations, the operations may further include: in response to receiving the query, dividing, based at least on a fourth quantity of time required to execute the query on a predetermined portion of the dataset, the query into the first plurality of tasks and the second plurality of tasks.

In some variations, the second quantity of worker threads may be equal to or less than the threshold corresponding to the first quantity of worker threads, the second quantity of data required for the second fetch call, and the third quantity of data buffered from the first fetch call.

In some variations, the dataset may include at least one database table having multiple partitions that are stored and processed at different nodes within the database.

In another aspect, there is provided a method for worker thread allocation. The method may include: receiving a first fetch call for a query accessing a dataset stored at a database, the first fetch call requiring a first portion of a result for the query; responding to the first fetch call by allocating a first quantity of worker threads to generate the first portion of the result for the query; responding to a second fetch call for the query by determining a threshold corresponding to the first quantity of worker threads, a second quantity of data required for the second fetch call, and a third quantity of data buffered from the first fetch call; and allocating, based at least on the threshold, a second quantity of worker threads to generate a second portion of the result for the query.

In some variations, one or more features disclosed herein including the following features can optionally be included in any feasible combination.

The first portion of the result and the second portion of the result may each include some but not all of the result for the query.

In some variations, the first portion of the result may include a first data responsive to the first fetch call and a second data for buffering in anticipation of the second fetch call.

In some variations, the second quantity of worker threads may be allocated in response to the second fetch call requiring more than the second data.

In some variations, the allocating of the second quantity of worker threads may include waking up one or more worker threads paused subsequent to the first fetch call.

In some variations, the allocating of the second quantity of worker threads may include instantiating one or more new worker threads.

In some variations, the first quantity of worker threads may be assigned to perform a first plurality of tasks associated with the query. The second quantity of worker threads may be assigned to perform a second quantity of tasks associated with the query.

In some variations, the method may further include: in response to receiving the query, dividing, based at least on a fourth quantity of time required to execute the query on a predetermined portion of the dataset, the query into the first plurality of tasks and the second plurality of tasks.

In some variations, the second quantity of worker threads may be equal to or less than the threshold corresponding to the first quantity of worker threads, the second quantity of data required for the second fetch call, and the third quantity of data buffered from the first fetch call.

In another aspect, there is provided a computer program product including a non-transitory computer readable medium storing instructions. The instructions may cause operations executed by at least one data processor. The operations may include: receiving a first fetch call for a query accessing a dataset stored at a database, the first fetch call requiring a first portion of a result for the query; responding to the first fetch call by allocating a first quantity of worker threads to generate the first portion of the result for the query; responding to a second fetch call for the query by determining a threshold corresponding to the first quantity of worker threads, a second quantity of data required for the second fetch call, and a third quantity of data buffered from the first fetch call; and allocating, based at least on the threshold, a second quantity of worker threads to generate a second portion of the result for the query.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the allocation of worker threads to resume execution of a query execution plan, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
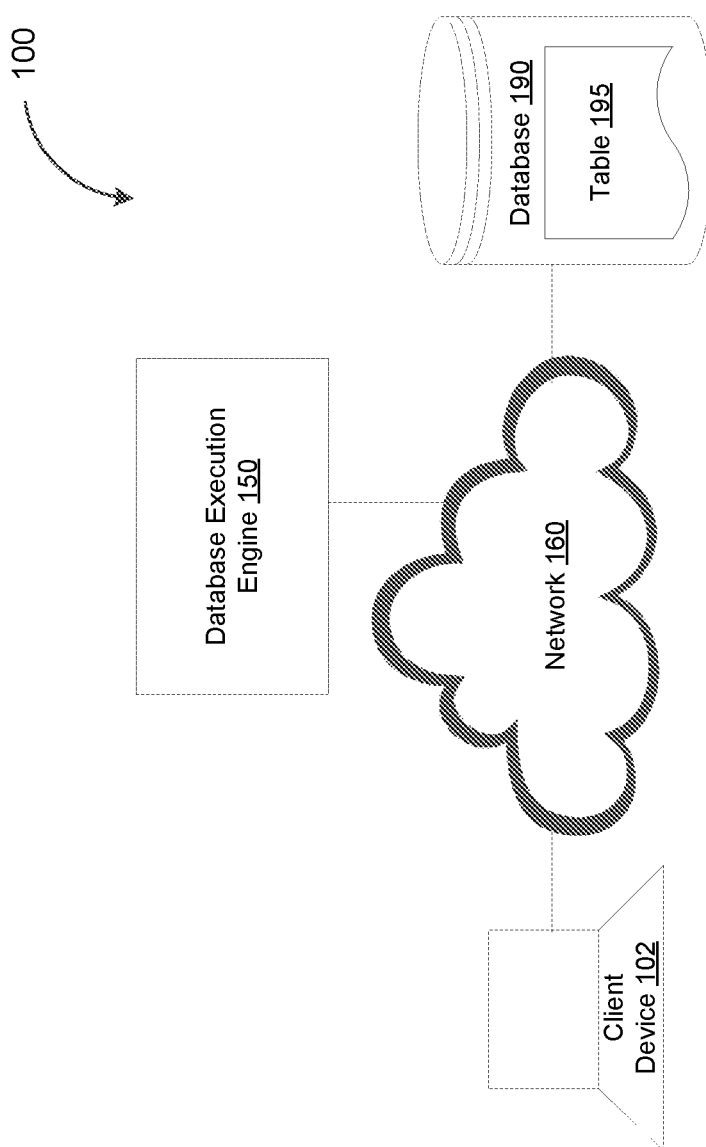
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In such a parallelization framework, a data execution engine may divide a query accessing a dataset (e.g., including one or more database tables) into a quantity of tasks determined based on the quantity of time required to execute the query on a portion the dataset having a predetermined size. As such, if a large quantity of time is required to execute the query on the portion of the dataset, the data execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the data execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads. That is, if the data execution engine detects an insufficient progress, the data execution engine may allocate additional worker threads to perform the tasks associated with the query.

In some example embodiments, in addition to parallelization, the data execution engine may also implement result streaming to support use cases that do not require all of the results of a query at once. With result streaming, the data execution engine may respond to a query by generating a portion of the result, which includes sufficient data for responding to the current fetch call and some additional data for buffering (e.g., in main memory) in anticipation of a future fetch call. The worker threads allocated to generate the portion of the result may be paused in between fetch calls, for example, by allowing these worker threads to sleep on a semaphore. In the event a subsequent fetch call requires more than the buffered data, the data execution engine may wake up the paused worker threads to continue performing the remaining tasks associated with the query. It should be appreciated that a worker thread may not pause mid-task but must complete an assigned task before it may pause to go to sleep.

Although the data execution engine may realize significant savings in computational resources (e.g., memory and processor power consumption) by generating the results of the query on a piecemeal and as-needed basis, those savings may be negated if the data execution engine allocates too many worker threads to perform the tasks associated with the query. Allocating an excessive quantity of worker threads may occur in the context of result streaming at least because the data execution engine increases worker thread allocation based on the progress of the query as a whole, which is not aligned with a result streaming scenario that does not necessarily require the data execution engine to generate the results of the query in full. Thus, an excessive quantity of worker threads may be allocated to generate data for the current fetch call. These worker threads may generate an excess of data, which is buffered (e.g., in main memory) but is likely to remain unused in the absence of subsequent fetch calls.

As such, in some example embodiments, the data execution engine may impose a threshold on the quantity of worker threads allocated whenever the data execution engine resumes execution of a query in response to a fetch call. For example, upon receiving a first fetch call for a query accessing a dataset (e.g., including one or more database tables), the data execution engine may allocate an initial quantity of worker threads to generate a first portion of the result for the query. The first portion of the result for the query may include sufficient data for responding to the first fetch call and some additional data for buffering (e.g., in main memory) in anticipation of a second fetch call at a later time.

Upon receiving the second fetch call (e.g., a subsequent fetch call that requires more data than what has been buffered from previous fetch calls), the data execution engine may determine to allocate no more than the threshold quantity of worker threads to generate a second portion of the result for the query. Here, the allocation of a worker thread may include waking up a sleeping worker thread that was paused after the first fetch call or instantiating a new worker thread altogether. Moreover, the threshold quantity of worker threads that are allocated for the second fetch call may be determined based on the quantity of worker threads used to generate the first portion of the result for the query and the quantity of buffered data. By imposing a threshold on worker thread allocation, the data execution engine may avoid allocating an excessive quantity of worker threads and prevent buffering an excessive quantity of potentially unused data (e.g., in main memory).

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
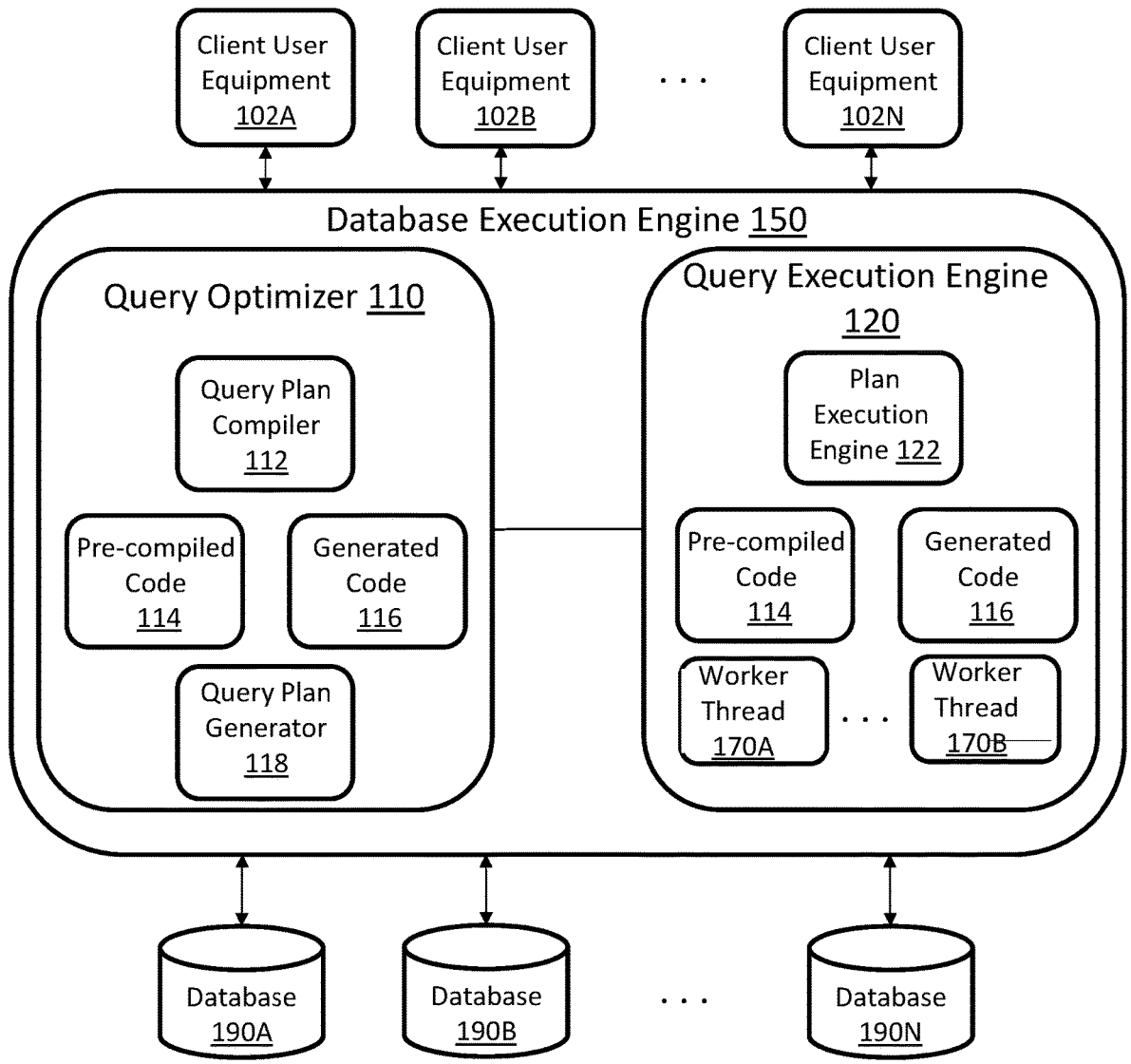
FIG. 2 depicts a block diagram illustrating an example of a database execution engine, in accordance with some example embodiments.

FIG. 2 depicts a block diagram illustrating an example of the data execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the data execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

Figure 3:
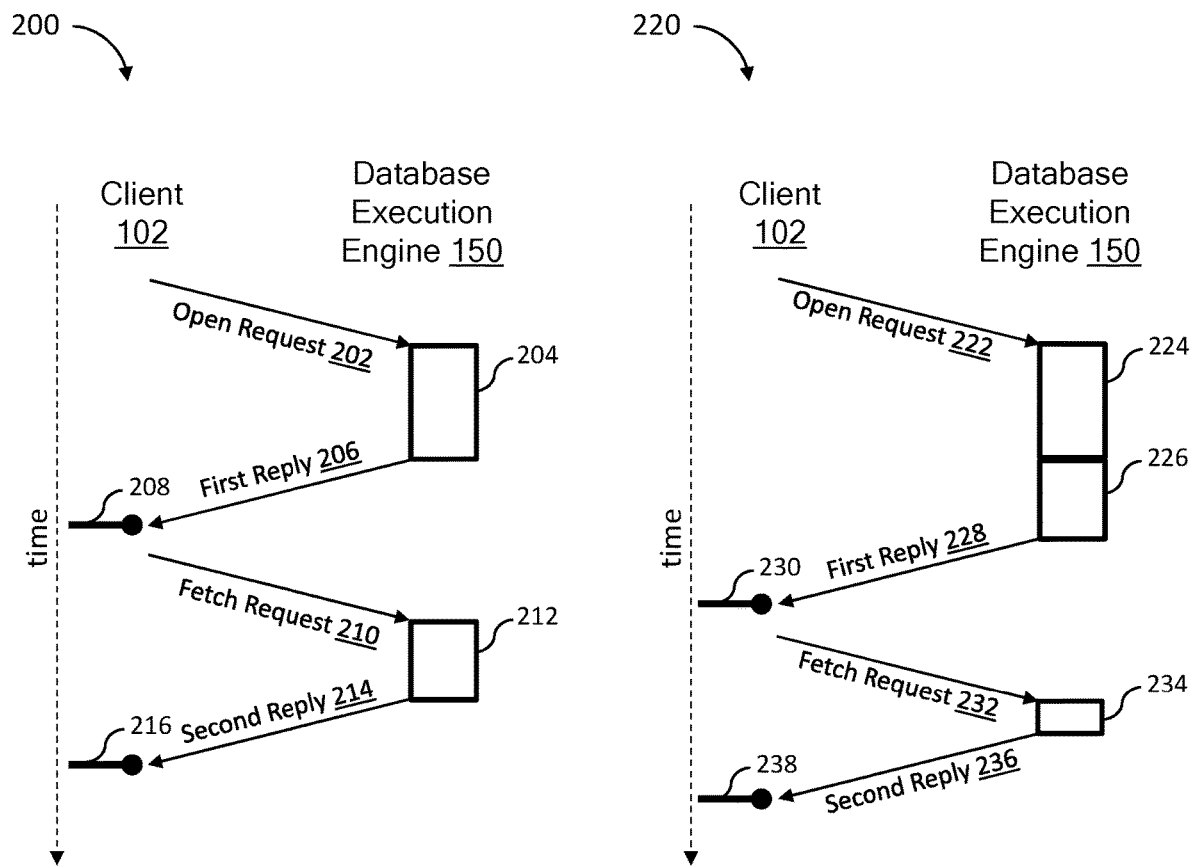
FIG. 3 depicts a schematic diagram illustrating an example of result streaming, in accordance with some example embodiments.

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the data execution engine 150 may divide the database table 195 into multiple partitions by applying one or more of a hash partitioning, round-robin partitioning, and range partitioning. For example, as shown in FIG. 3, the database table 195 may be divided into a first partition 165a, a second partition 165b, and a third partition 165c. Moreover, the first partition 165a may be stored at the first database 190A, the second partition 165b may be stored at the second database 190B, and the third partition 165c may be stored at the third database 190C.

To execute a query accessing a dataset that includes, for example, the database table 195, the data execution engine 150 may divide the query into a quantity of tasks determined based on the quantity of time required to execute the query on a portion the dataset having a predetermined size. Accordingly, if a large quantity of time is required to execute the query on the portion of the dataset, the data execution engine 150 may determine that the query is computationally intensive and thus divide the query into a larger quantity of smaller tasks. One or more of the worker threads 170 (e.g., a first worker thread 170A, a second worker thread 170B, and/or the like) may be allocated to perform the tasks associated with the query. The quantity of the worker threads 170 the data execution engine 150 allocates may be determined based on the progress of the query observed at various time intervals. For example, upon allocating an initial quantity of the worker threads 170 to perform the tasks associated with the query, the data execution engine 150 may monitor the progress of the query (e.g., the quantity of tasks that have not been performed by any the worker threads 170, the quantity of tasks that have been performed relative to the total quantity of outstanding tasks, and/or the like) to determine whether to increase that initial quantity of the worker threads 170.

In some example embodiments, in addition to parallelization, the data execution engine 150 may also implement result streaming to support use cases that do not require all of the results of a query at once. With result streaming, the data execution engine 150 may respond to a query by generating a portion of the result that includes sufficient data for responding to the current fetch call and some additional data for buffering (e.g., in main memory) in anticipation of a future fetch call. The one or more worker threads 170 allocated to generate the portion of the result may be paused in between fetch calls, for example, by allowing the one or more worker threads 170 to complete their respective tasks before going to sleep on a semaphore. Upon receiving a subsequent fetch call that requires more than the buffered data, the data execution engine 150 may wake up the paused worker threads 170 to continue performing the remaining tasks associated with the query.

As used herein, the term "fetch call" may refer to a particular type of request that form a part of a query requesting data from the one or more databases 190. For example, the data execution engine 150 may receive, from the client device 102, an open request to initiate the query. Following the initial open request, the data execution engine 150 may receive one or more subsequent fetch calls, each of which requesting at least a portion of the results of the query. That is, a single fetch call may request, from the data execution engine 150, at least a portion of the results associated with the query. The data execution engine 150 may continue to receive fetch calls until the client device 102 sends a request to close the query, which may occur when some or all of the results of the query are provided to the client device 102.

To further illustrate, FIG. 3 depicts schematic diagram illustrating an example of result streaming, in accordance with some example embodiments. FIG. 3 illustrates aspects related to the pause operation with the sequence 200 corresponding to the pause operation and the sequence 220 corresponding to a standard data request query and execution, with emphasize on the timing differences provided by the pause operation.

With reference to the sequence 200, an open request 202 is sent by the client device 102 to the database execution engine 150. In response to the open request 202, the database execution engine 150 compiles a first subset or batch of results 204. The first subset of results 204 are sent to the user client equipment 102 in a first reply 206, which are received by the client device 102 at a first time 208. During this time, the database execution engine 150 waits for a subsequent fetch request without utilizing additional resources. The client device 102 may later send a fetch request 210. In response to the fetch request 210, the database execution engine 150 compiles a second subset or batch of results 212. The second subset of results 212 are sent to the user client equipment 102 in a second reply 214, received by the client device 102 at a second time 216. As noted, additional fetch requests from the client device 102 and results from the database execution engine 150 may be incorporated.

Comparing the sequence 200 of the pause operation consistent with implementations of the current subject matter, sequence 220 illustrates a standard data request query sent from the client device 102 to the database execution engine 150. An open request 222 is sent to and received by the database execution engine 150. The database execution engine 150 computes a full query result that includes, for example, a first subset of results 204 to satisfy the open request 222 and a second subset of results 226 to satisfy subsequent fetch requests. The first subset of results 224 are sent to the user client equipment 102 in a first reply 228, which are received by the client device 102 at a first time 230. The client device 102 may later send a fetch request 232. In response to the fetch request 232, the database execution engine 150 obtains the second subset of results 226 from a shared memory buffer 234 (where 234 represents an amount of time needed to copy the second subset of results 226 from the shared memory buffer). The second subset of results 226 are sent to the user client equipment 102 in a second reply 236, received by the client device 102 at a second time 238. As noted, additional fetch requests from the client device 102 and results from the database execution engine 150 may be incorporated.

The first times 208 and 230 thus are the times at which the first subset of results to satisfy the user query are received using the pause operation and a standard operation, respectively. As can be seen in FIG. 3, the pause operation (sequence 200) provides the first subset of results 204 in a shorter amount of time than that provided by the standard operation (220). Additionally, the pause operation provides the second subset of results 212 in a shorter amount of time than that provided by the standard operation. Moreover, the total amount of time to receive the full query result is less using the pause operation.

Although the data execution engine 150 may realize significant savings in computational resources (e.g., memory and processor power consumption) by implementing result streaming such that the results of a query are generated on a piecemeal and as-needed basis, those savings may be negated if the data execution engine 150 allocates too many worker threads 170 to perform the tasks associated with the query. Allocating an excessive quantity of the worker threads 170 may occur in the context of result streaming at least because the data execution engine 150 increases worker thread allocation based on the progress of the query as a whole, even though result streaming precludes the data execution engine 150 from generating all of the results of the query at once. As such, in some example embodiments, the data execution engine 150 may impose a threshold on the quantity of the worker threads 170 allocated whenever the data execution engine 150 resumes execution of a query in response to a fetch call.

In some example embodiments, upon receiving a first fetch call for a query accessing a dataset stored at the one or more databases 190 (e.g., the database table 195), the data execution engine 150 may allocate an initial quantity of the worker threads 170 to generate a first portion of the result for the query. The first portion of the result for the query may include sufficient data for responding to the first fetch call and some additional data for buffering (e.g., in main memory) in anticipation of a second fetch call at a later time. Upon receiving the second fetch call, the data execution engine 150 may determine to allocate no more than the threshold quantity of the worker threads 170 to generate a second portion of the result for the query. For example, the data execution engine 150 may allocate one or more of the worker threads 170 by waking up the first worker thread 170A and/or instantiating the second worker thread 170B. The threshold quantity of the worker threads 170 the data execution engine 150 allocates for the second fetch call may be determined based on the quantity of the worker threads 170 used to generate the first portion of the result for the query and the quantity of buffered data. For instance, the data execution engine 150 may determine this threshold quantity T based on Equation (1) below. According to Equation (1), the threshold quantity of the worker threads 170 that the data execution engine 150 may allocate may be determined based on a first quantity of worker threads allocated for a previous fetch call (workers_alloc), a second quantity of data required for the current fetch call (results_needed_until_next_pause), and a third quantity of data buffered from the previous fetch call (results_buffered_from_prev_fetch).

$$T = \max\left(\text{workers\_alloc}, \text{workers\_alloc} \times \frac{\text{results\_needed\_until\_next\_pause}}{\text{results\_buffered\_from\_prev\_fetch}}\right) \quad (1)$$

Figure 4:
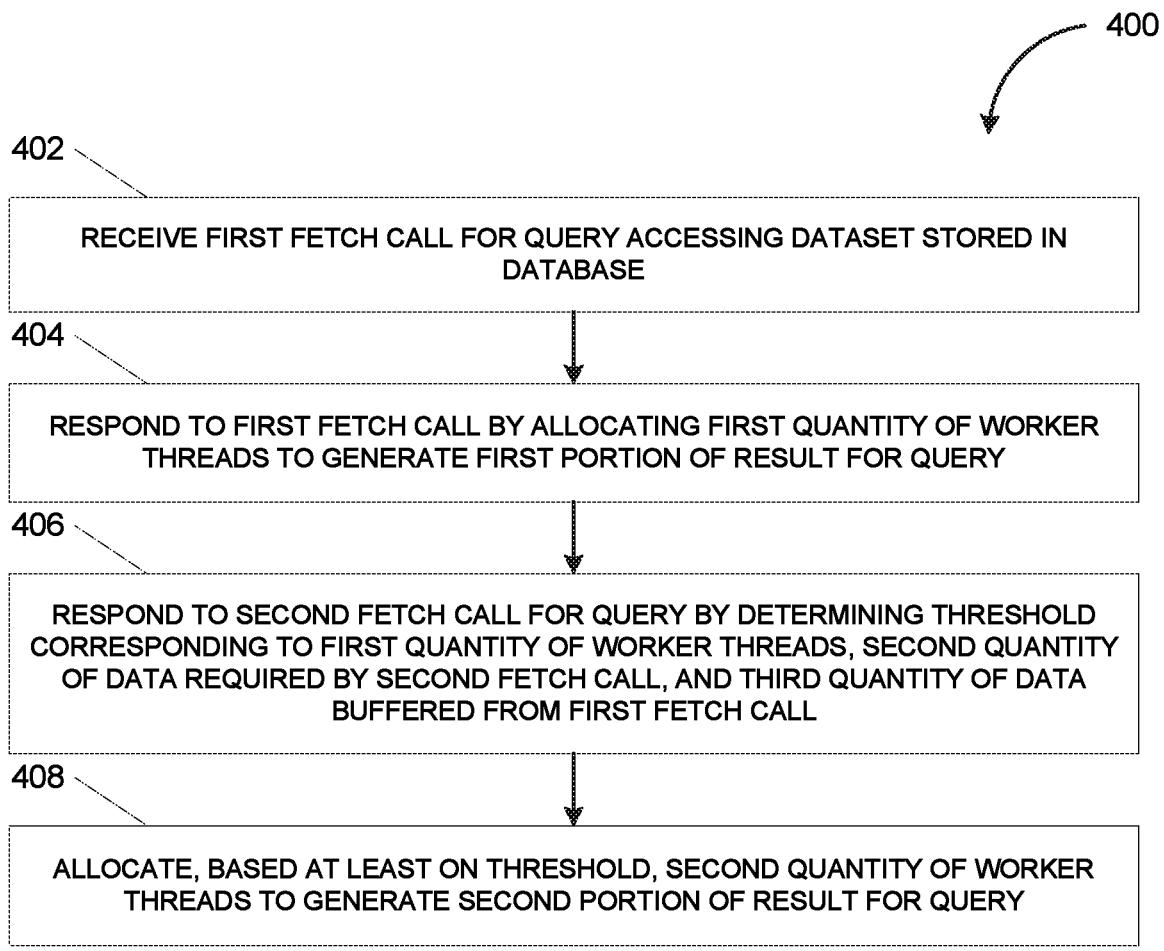
FIG. 4 depicts a flowchart illustrating an example of a process for worker thread allocation, in accordance with some example embodiments.

FIG. 4 depicts a flowchart illustrating an example of a process 400 for worker thread allocation, in accordance with some example embodiments. Referring to FIGS. 1-4, the process 400 may be performed by the data execution engine 150 in order to execute a query accessing the database table 195 stored at the one or more databases 190.

At 402, the data execution engine 150 may receive a first fetch call for a query accessing a dataset stored in a database. For example, the data execution engine 150 may receive, from the one or more client devices 120, a first fetch call of a query accessing a dataset stored at the one or more databases 190 (e.g., the database table 195). As shown in FIG. 3, the database table 195 may include multiple partitions including, for example, the first partition 165a, the second partition 165b, and the third partition 165c which, in cases where the database layer associated with the data execution engine 150 provides a distributed data storage, may be stored across multiple nodes including, for example, the first database 190A, the second database 190B, the third database 190C, and/or the like. The first fetch call may require some but not all of the results associated with the query. For instance, the first fetch call may require the results of executing the query on some but not all of the records occupying one or more of the first partition 165a, the second partition 165b, and the third partition 165c of the database table 195.

At 404, the data execution engine 150 may respond to the first fetch call by allocating a first quantity of worker threads to generate a first portion of the result for the query. In some example embodiments, upon receiving the first fetch call for the query accessing the dataset stored at the one or more databases 190 (e.g., the database table 195), the data execution engine 150 may allocate an initial quantity of the worker threads 170 to generate a first portion of the result for the query. The first portion of the result for the query may include sufficient data for responding to the first fetch call. Moreover, the first portion of the result for the query may include some additional data, which may be buffered (e.g., in main memory) in anticipation of a second fetch call at a later time. This initial quantity of the worker threads 170 may be paused (e.g., to sleep on a semaphore) upon generating the first portion of the result for the query.

At 406, the data execution engine 150 may respond to the second fetch call for the query by determining a threshold corresponding to the first quantity of worker threads, a second quantity of data required for the second fetch call, and a third quantity of data buffered from the first fetch call. In some example embodiments, the data execution engine 150 may allocate one or more of the worker threads 170 when a subsequent fetch call requires more data than what was buffered from a previous fetch call. However, to avoid allocating an excess quantity of worker threads and generating an excess of data for buffering, the data execution engine 150 may impose a threshold on the quantity of the worker threads 170 allocated to respond to these subsequent fetch calls. For example, in response to a second fetch call that requires more than the data buffered for the first fetch call, the data execution engine 150 may determine a threshold on the quantity of the worker threads 170 to allocate for the second fetch call. In accordance with Equation (1) above, this threshold may be determined based the first quantity of worker threads allocated for the first fetch call (workers_alloc), a second quantity of data required for the second fetch call (results_needed_until_next_pause), and a third quantity of data buffered from the first fetch call (results_buffered_from_prev_fetch).

At 408, the data execution engine 150 may allocate, based at least on the threshold, a second quantity of worker threads to generate a second portion of the result for the query. For example, the data execution engine 150 may allocate no more than the threshold quantity of the worker threads 170, which may include waking up a sleeping worker thread (e.g., the worker thread 170A) and/or instantiating a new worker thread (e.g., the second worker thread 170B). These worker threads 170 may resume execution of the query, for example, by performing one or more of the remaining tasks associated with the query. In doing so, the worker threads 170 may generate a second portion of the result for the query, which may include data responsive to the second fetch call as well as data for buffering (e.g., in main memory) in anticipation of yet a third fetch call at a later time.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a first fetch call for a query accessing a dataset stored at a database, the first fetch call requiring a first portion of a result for the query; responding to the first fetch call by allocating a first quantity of worker threads to generate the first portion of the result for the query; responding to a second fetch call for the query by determining a threshold corresponding to the first quantity of worker threads, a second quantity of data required for the second fetch call, and a third quantity of data buffered from the first fetch call; and allocating, based at least on the threshold, a second quantity of worker threads to generate a second portion of the result for the query.

Example 2: The system of Example 1, wherein the first portion of the result and the second portion of the result each comprise some but not all of the result for the query.

Example 3: The system of any one of Examples 1 to 2, wherein the first portion of the result include a first data responsive to the first fetch call and a second data for buffering in anticipation of the second fetch call.

Example 4: The system of Example 3, wherein the second quantity of worker threads are allocated in response to the second fetch call requiring more than the second data.

Example 5: The system of any one of Examples 1 to 4, wherein the allocating of the second quantity of worker threads includes waking up one or more worker threads paused subsequent to the first fetch call.

Example 6: The system of any one of Examples 1 to 5, wherein the allocating of the second quantity of worker threads includes instantiating one or more new worker threads.

Example 7: The system of any one of Examples 1 to 6, wherein the first quantity of worker threads are assigned to perform a first plurality of tasks associated with the query, and wherein the second quantity of worker threads are assigned to perform a second quantity of tasks associated with the query.

Example 8: The system of Example 7, wherein the operations further comprise: in response to receiving the query, dividing, based at least on a fourth quantity of time required to execute the query on a predetermined portion of the dataset, the query into the first plurality of tasks and the second plurality of tasks.

Example 9: The system of any one of Examples 1 to 8, wherein the second quantity of worker threads is equal to or less than the threshold corresponding to the first quantity of worker threads, the second quantity of data required for the second fetch call, and the third quantity of data buffered from the first fetch call.

Example 10: The system of any one of Examples 1 to 9, wherein the dataset includes at least one database table having multiple partitions that are stored and processed at different nodes within the database.

Example 11: A method, comprising: receiving a first fetch call for a query accessing a dataset stored at a database, the first fetch call requiring a first portion of a result for the query; responding to the first fetch call by allocating a first quantity of worker threads to generate the first portion of the result for the query; responding to a second fetch call for the query by determining a threshold corresponding to the first quantity of worker threads, a second quantity of data required for the second fetch call, and a third quantity of data buffered from the first fetch call; and allocating, based at least on the threshold, a second quantity of worker threads to generate a second portion of the result for the query.

Example 12: The method of Example 11, wherein the first portion of the result and the second portion of the result each comprise some but not all of the result for the query.

Example 13: The method of any one of Examples 11 to 12, wherein the first portion of the result include a first data responsive to the first fetch call and a second data for buffering in anticipation of the second fetch call.

Example 14: The method of Example 13, wherein the second quantity of worker threads are allocated in response to the second fetch call requiring more than the second data.

Example 15: The method of any one of Examples 11 to 14, wherein the allocating of the second quantity of worker threads includes waking up one or more worker threads paused subsequent to the first fetch call.

Example 16: The method of any one of Examples 11 to 15, wherein the allocating of the second quantity of worker threads includes instantiating one or more new worker threads.

Example 17: The method of any one of Examples 11 to 16, wherein the first quantity of worker threads are assigned to perform a first plurality of tasks associated with the query, and wherein the second quantity of worker threads are assigned to perform a second quantity of tasks associated with the query.

Example 18: The method of Example 17, wherein the operations further comprise: in response to receiving the query, dividing, based at least on a fourth quantity of time required to execute the query on a predetermined portion of the dataset, the query into the first plurality of tasks and the second plurality of tasks.

Example 19: The method of any one of Examples 11 to 18, wherein the second quantity of worker threads is equal to or less than the threshold corresponding to the first quantity of worker threads, the second quantity of data required for the second fetch call, and the third quantity of data buffered from the first fetch call.

Example 20: A non-transitory computer readable medium storing instructions, which when executed by at least one data processor, result in operations comprising: receiving a first fetch call for a query accessing a dataset stored at a database, the first fetch call requiring a first portion of a result for the query; responding to the first fetch call by allocating a first quantity of worker threads to generate the first portion of the result for the query; responding to a second fetch call for the query by determining a threshold corresponding to the first quantity of worker threads, a second quantity of data required for the second fetch call, and a third quantity of data buffered from the first fetch call; and allocating, based at least on the threshold, a second quantity of worker threads to generate a second portion of the result for the query.

Figure 5:
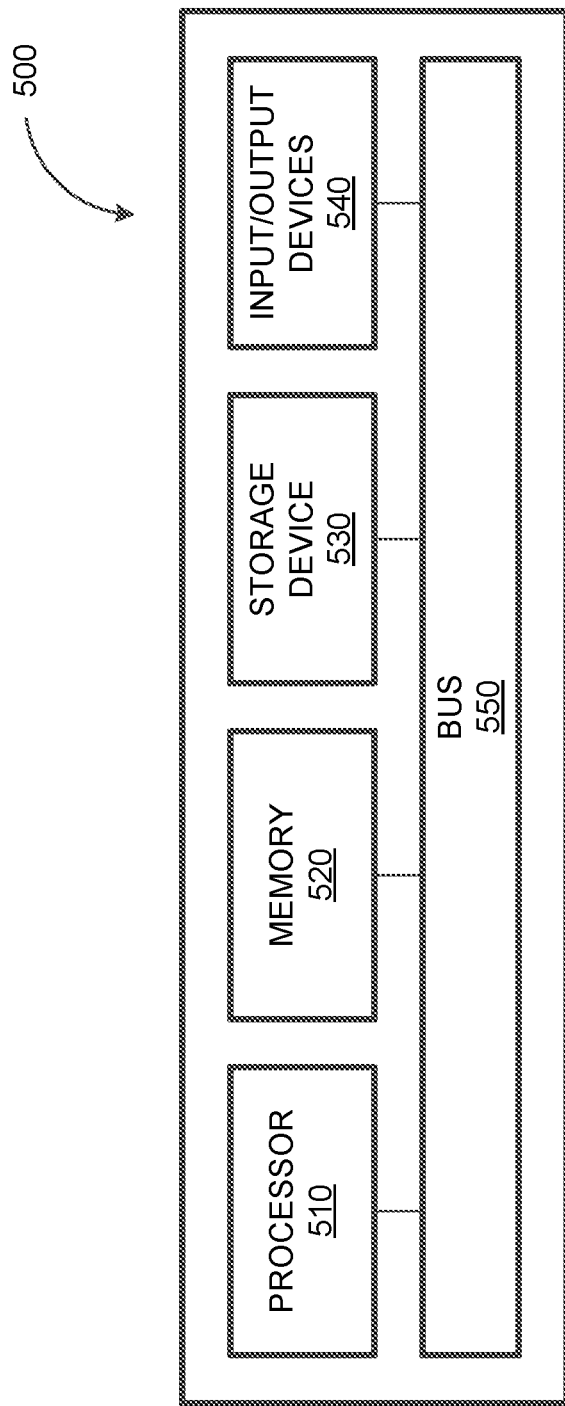
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the data execution engine 150 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc.

The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      receiving a first fetch call for a query accessing a dataset stored at a database, the first fetch call requiring a first portion of a result for the query;
      responding to the first fetch call by allocating a first quantity of worker threads to generate the first portion of the result for the query;
      responding to a second fetch call for the query by determining a threshold corresponding to the first quantity of worker threads, a second quantity of data required for the second fetch call, and a third quantity of data buffered from the first fetch call; and
      allocating, based at least on the threshold, a second quantity of worker threads to generate a second portion of the result for the query.

2. The system of claim 1, wherein the first portion of the result and the second portion of the result each comprise some but not all of the result for the query.

3. The system of claim 1, wherein the first portion of the result include a first data responsive to the first fetch call and a second data for buffering in anticipation of the second fetch call.

4. The system of claim 3, wherein the second quantity of worker threads are allocated in response to the second fetch call requiring more than the second data.

5. The system of claim 1, wherein the allocating of the second quantity of worker threads includes waking up one or more worker threads paused subsequent to the first fetch call.

6. The system of claim 1, wherein the allocating of the second quantity of worker threads includes instantiating one or more new worker threads.

7. The system of claim 1, wherein the first quantity of worker threads are assigned to perform a first plurality of tasks associated with the query, and wherein the second quantity of worker threads are assigned to perform a second quantity of tasks associated with the query.

8. The system of claim 7, wherein the operations further comprise:
in response to receiving the query, dividing, based at least on a fourth quantity of time required to execute the query on a predetermined portion of the dataset, the query into the first plurality of tasks and the second plurality of tasks.

9. The system of claim 1, wherein the second quantity of worker threads is equal to or less than the threshold corresponding to the first quantity of worker threads, the second quantity of data required for the second fetch call, and the third quantity of data buffered from the first fetch call.

10. The system of claim 1, wherein the dataset includes at least one database table having multiple partitions that are stored and processed at different nodes within the database.

11. A computer-implemented method, comprising:
receiving a first fetch call for a query accessing a dataset stored at a database, the first fetch call requiring a first portion of a result for the query;
responding to the first fetch call by allocating a first quantity of worker threads to generate the first portion of the result for the query;
responding to a second fetch call for the query by determining a threshold corresponding to the first quantity of worker threads, a second quantity of data required for the second fetch call, and a third quantity of data buffered from the first fetch call; and
allocating, based at least on the threshold, a second quantity of worker threads to generate a second portion of the result for the query.

12. The method of claim 11, wherein the first portion of the result and the second portion of the result each comprise some but not all of the result for the query.

13. The method of claim 11, wherein the first portion of the result include a first data responsive to the first fetch call and a second data for buffering in anticipation of the second fetch call.

14. The method of claim 13, wherein the second quantity of worker threads are allocated in response to the second fetch call requiring more than the second data.

15. The method of claim 11, wherein the allocating of the second quantity of worker threads includes waking up one or more worker threads paused subsequent to the first fetch call.

16. The method of claim 11, wherein the allocating of the second quantity of worker threads includes instantiating one or more new worker threads.

17. The method of claim 11, wherein the first quantity of worker threads are assigned to perform a first plurality of tasks associated with the query, and wherein the second quantity of worker threads are assigned to perform a second quantity of tasks associated with the query.

18. The method of claim 17, wherein the operations further comprise:
in response to receiving the query, dividing, based at least on a fourth quantity of time required to execute the query on a predetermined portion of the dataset, the query into the first plurality of tasks and the second plurality of tasks.

19. The method of claim 11, wherein the second quantity of worker threads is equal to or less than the threshold corresponding to the first quantity of worker threads, the second quantity of data required for the second fetch call, and the third quantity of data buffered from the first fetch call.

20. A non-transitory computer readable medium storing instructions, which when executed by at least one data processor, result in operations comprising:
receiving a first fetch call for a query accessing a dataset stored at a database, the first fetch call requiring a first portion of a result for the query;
responding to the first fetch call by allocating a first quantity of worker threads to generate the first portion of the result for the query;
responding to a second fetch call for the query by determining a threshold corresponding to the first quantity of worker threads, a second quantity of data required for the second fetch call, and a third quantity of data buffered from the first fetch call; and
allocating, based at least on the threshold, a second quantity of worker threads to generate a second portion of the result for the query.

\* \* \* \* \*